United States Patent
Kumar

(10) Patent No.: US 7,406,634 B2
(45) Date of Patent: Jul. 29, 2008

(54) METHOD AND APPARATUS FOR UTILIZING AN EXCEPTION HANDLER TO AVOID HANGING UP A CPU WHEN A PERIPHERAL DEVICE DOES NOT RESPOND

(75) Inventor: Sampath Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 581 days.

(21) Appl. No.: 11/003,134

(22) Filed: Dec. 2, 2004

(65) Prior Publication Data

US 2006/0156074 A1    Jul. 13, 2006

(51) Int. Cl.
*G06F 11/00* (2006.01)
(52) U.S. Cl. .............................. 714/51; 714/23; 714/47; 714/55
(58) Field of Classification Search .................... 714/51, 714/55, 47
See application file for complete search history.

(56) References Cited

U.S. PATENT DOCUMENTS 6,011,908 A * 1/2000 Wing et al. ................... 714/19
6,058,447 A * 5/2000 Holst et al. .................. 710/105
6,618,825 B1 * 9/2003 Shaw .......................... 714/55

OTHER PUBLICATIONS

Broadcom, Migrating CPU Specific Code from the PowerPC to the Broadcom SB-1 Processor, White Paper, May 22, 2002, Broadcom Corp., Irvine, CA; downloaded from the Internet: <http://www.broadcom.com/collateral/wp/SB-1_WP100-R.pdf>.

* cited by examiner

*Primary Examiner*—Yolanda L Wilson
(74) *Attorney, Agent, or Firm*—Charles E. Krueger

(57) ABSTRACT

A method and apparatus utilizes an exception handler to implement LOAD and STORE instructions for moving data between a peripheral device and CPU registers. TLB entries for peripheral devices are flagged invalid during initialization and an exception handler occurs when LOAD or STORE instructions are executed by the CPU. The exception handler programs a data mover to perform the LOAD or STORE instruction so that the CPU will not hang up in the event that the peripheral device does not respond thereby avoiding reset of the SOC by the watchdog timer.

If the peripheral device does not respond before an exception handler timer expires an error is indicated by the exception handler.

18 Claims, 4 Drawing Sheets

| STATUS (VB) | VA | PA | CONTROL |

FIG. 2

METHOD AND APPARATUS FOR UTILIZING AN EXCEPTION HANDLER TO AVOID HANGING UP A CPU WHEN A PERIPHERAL DEVICE DOES NOT RESPOND

BACKGROUND OF THE INVENTION

A modern System-on-a Chip (SOC), such as the Broadcom BCM1125H, include a CPU, memory controller, data mover, and other components that were previously implemented as separate devices and interconnected on printed circuit boards. While SOCs provide many advantages, they also make debugging certain error conditions difficult.

One example of an error condition is a non-responsive peripheral device that causes the CPU to hang up waiting for a response. Many systems use a watchdog timer to guard against bad devices hanging up the CPU and against other error conditions. If a device does not respond within a time-out period the watchdog timer resets the CPU and, after reset, a diagnostic routine, such as a bootstrap handler, diagnoses the problem, fetching the address of the failed peripheral device from the memory controller. With an SOC, such as the Broadcom chip, the watchdog timer resets the entire SOC, including the memory controller, making debugging very difficult since address information of the bad device has been lost.

The challenges in the field of debugging and error recovery continue to increase with demands for more and better techniques having greater flexibility and adaptability. Therefore, a need has arisen for a new system and method for debugging and error recovery in an SOC.

In accordance with the present invention, a system and method for debugging and error recovery for use with an SOC is provided that addresses disadvantages and problems associated with previously developed systems and methods.

BRIEF SUMMARY OF THE INVENTION

In one embodiment of the invention, TLB (Translation Look-aside Buffer) entries for the peripheral devices are flagged invalid at initialization so that a read or write to the device causes a TLB exception handler to occur during address translation. The exception handler identifies the LOAD or STORE instruction that caused the exception and reissues the instruction to a data mover that performs the data transfer specified by the LOAD or STORE instruction.

In another embodiment of the invention, the data mover transfers data between a peripheral device and memory and then the CPU executes a LOAD or STORE instruction to transfer the data between memory and CPU registers.

In another embodiment of the invention, the exception handler sets a timer. If the timer expires before the data mover completes, an error is indicated.

In another embodiment of the invention, error recovery routines are implemented by an external device such as an FPGA.

Other features and advantages of the invention will be apparent in view of the following detailed description and appended drawings.

BRIEF DESCRIPTION OF THE DRAWINGS

FIG. 2 is a schematic diagram of a TLB entry;

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1:
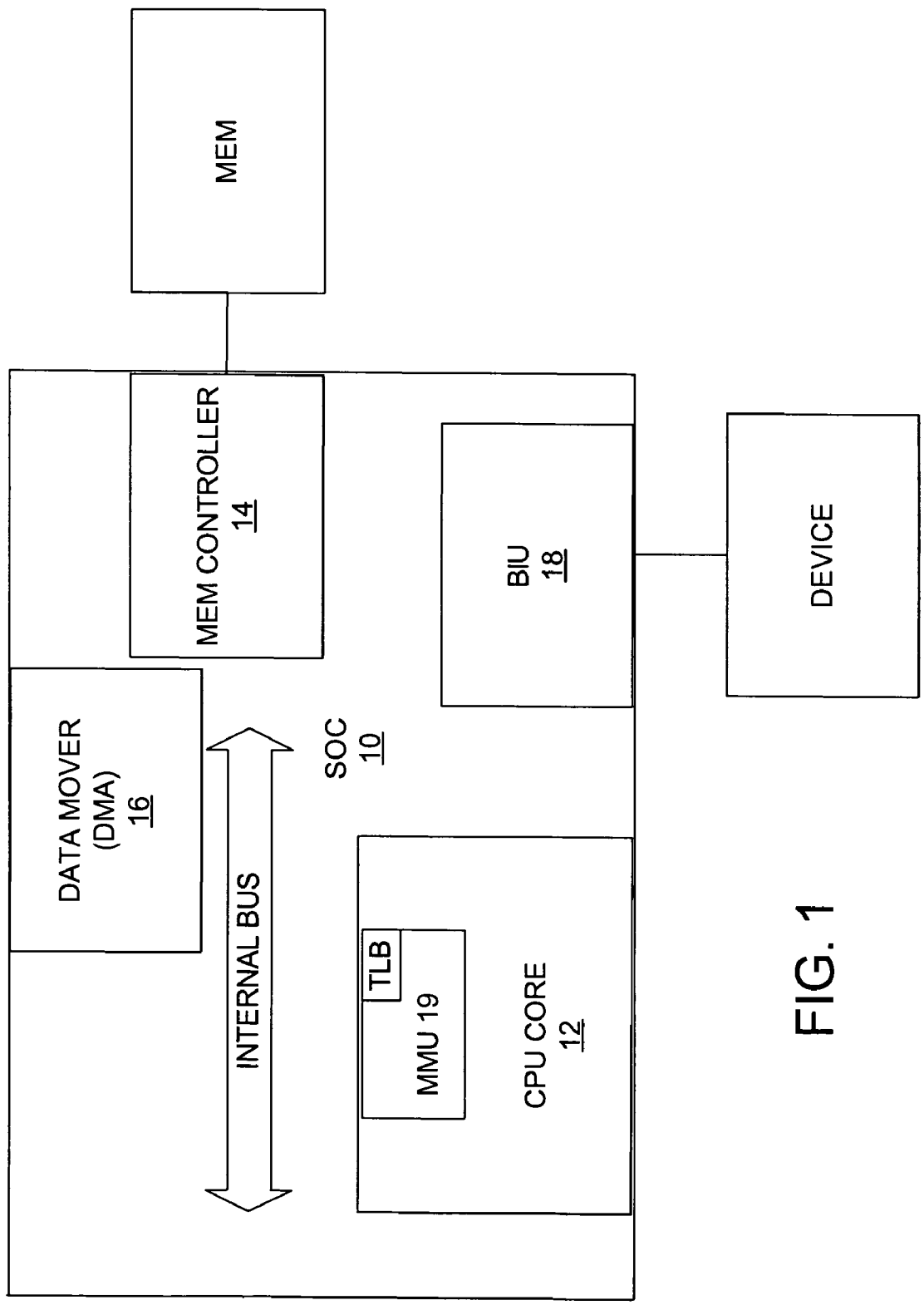
FIG. 1 is a high-level block diagram of a SOC.

FIG. 1 is a high-level block diagram of a SOC, such as the BCM1125H, manufactured by Broadcom. The SOC 10 includes CPU 12, Memory Controller 14, data mover (Direct Memory Access Controller) 16, and a Bus Interface Unit (BIU) 18 such as 32-bit PCI interface or an HT (Hyper-Transport) bus interface. The CPU includes a Memory Management Unit (MMU) 19 that translates between virtual addresses and physical addresses and the MMU includes a TLB (Translation Look-Aside Buffer) that is a table holding translations for most recently used and frequently occurring virtual addresses.

A PCI bus defines an interface between a host CPU and a number of peripheral devices. The number of devices supported by the bus can be increased by utilizing PCI to PCI (P2P) bridges to couple PCI bus segment and extend the bus.

A single memory map applies to all the PCI bus segments so that a given memory address specifies a unique PCI bus segment and device on the segment. The PCI allows for bus masters so that, for examples, two network devices may communicate directly without CPU intervention.

Figure 2:
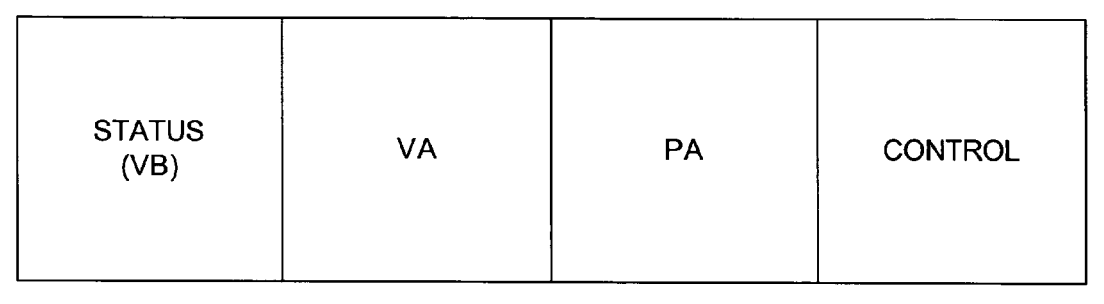

The MMU performs address translation between virtual addresses (VAs) and physical addresses (PAs) and refers first to the TLB as part of the translation procedure. FIG. 2 is a schematic diagram of an entry of the TLB, which is a table holding a number of such entries. Each entry includes a VA/PA pair, status information including a valid flag, and, optionally, control information. The TLB holds address translation pairs that are referenced frequently and includes the address translation pairs for peripheral devices connected to the SOC.

As described above, the SOC includes a watchdog timer that is periodically restarted by software so that the timer never expires if the software is operating properly. A simple example of psuedo-code for implementing the restart of the watchdog timer is:

```
main
{
    for(;;)
    {
        restart watchdog timer;
        ...
        read peripheral deviceA( );
        ...
    }
}
```

In this example, the time-out period of the watchdog timer is selected so that all the routines in the "for" loop, including the execution of the LOAD instruction for reading data from a source storage location in the peripheral device A to a destination register in the CPU to a storage location of the peripheral device A, will be completed before the watchdog timer expires so that the watchdog timer will never expire if the peripheral device is operating correctly. The CPU is unable to execute other instructions until the LOAD instruction completes. If the peripheral device A is not functioning properly the LOAD instruction will not complete and the watchdog timer will expire before it is reset so that the entire SOC, including the Memory Controller, will be reset making identification of the faulty peripheral device difficult during debugging and error recovery.

Figure 3:
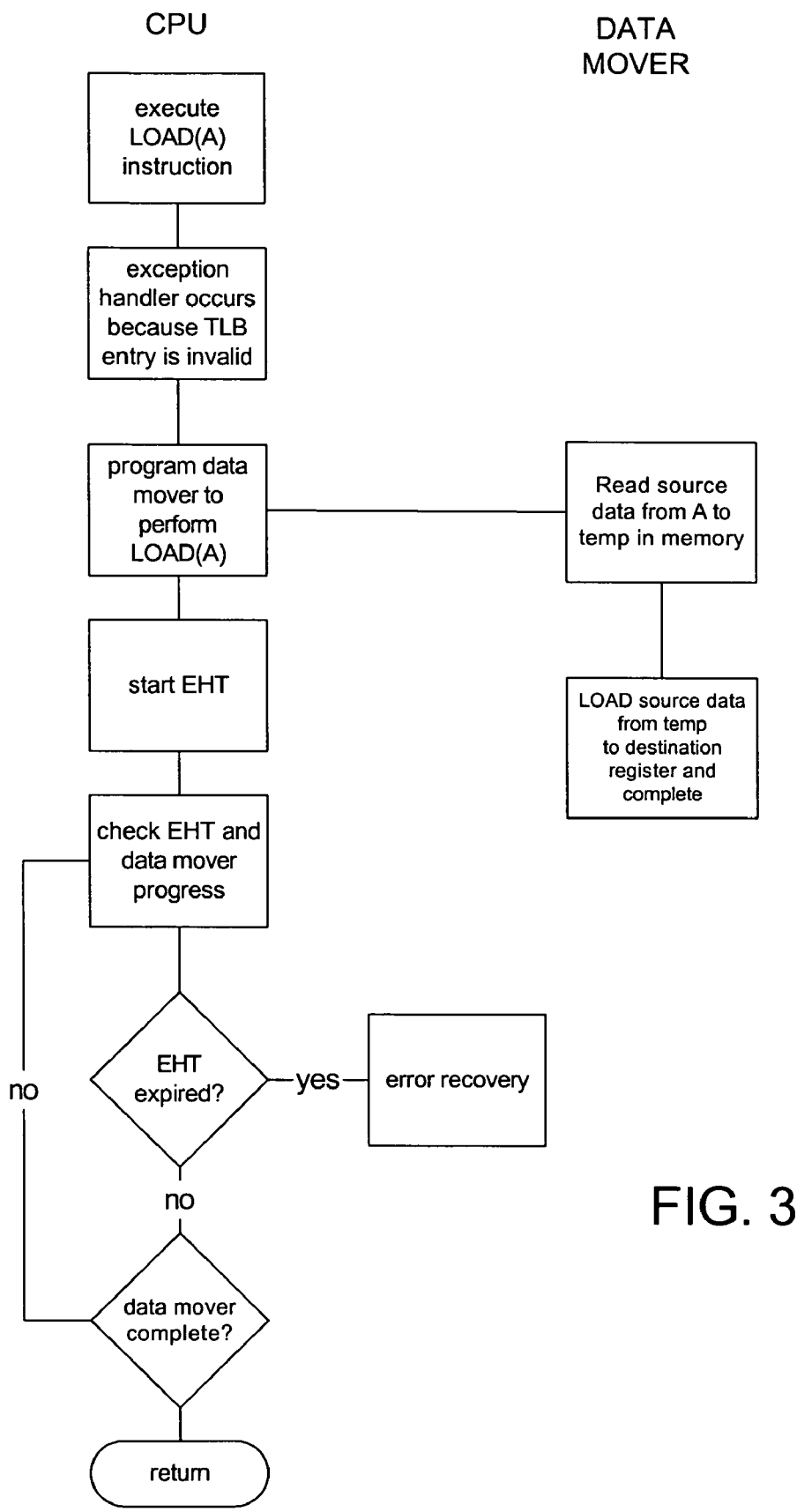
FIG. 3 is a flow-chart depicting the operation of an embodiment of the invention.

An embodiment of the invention will now be described with reference to FIGS. 1 and 2 and the flow chart of FIG. 3. In this example, the operation of an embodiment of the invention is described when a LOAD instruction, with a source storage location in peripheral device A and a destination register in the CPU, is executed by the CPU.

The MMU accesses the TLB when it translates a VA to PA. The VA is used to access the TLB entry that includes the VA and if the entry is flagged as invalid an exception occurs. In this embodiment, the initialization routine flags invalid every TLB entry of selected peripheral devices.

Accordingly, when the LOAD device(A) instruction is executed the MMU will use the virtual address of peripheral device (A), VA(A), to access the TLB entry, a TLB exception handler will occur because the entry for VA(A) is flagged invalid.

The exception handler identifies the LOAD instruction to be executed and programs the data mover to perform the data transfer involving device A specified by the instruction without the CPU having to execute a LOAD or STORE instruction involving device A. The CPU is then able to continue executing instructions and will reset the watchdog timer regardless of whether the LOAD to peripheral device A completes before the watchdog time interval expires.

The Data Mover transfers data from the source location in device A to a temporary location (temp) in Memory and then a LOAD(temp) instruction is executed for moving the data from temp to the destination register in the CPU. The execution of the LOAD(temp) instruction is very unlikely to hang up the CPU because LOAD instructions with source data in Memory are very reliable.

The exception handler monitors the completion status of the data mover and terminates when the data mover has completed loading the data from the source location in peripheral device A to the destination register in the CPU.

In this embodiment, the exception handler sets its own timer (EHT) and monitors the EHT. If the data mover fails to complete before the EHT expires there is some problem with peripheral device A and the need for error recovery is indicated. In this embodiment, the data mover will have been unable to read data from peripheral device A in order to store the data in temp. Thus, the problem with peripheral device is discovered by the inability of the data mover to access the device and does not hang up the CPU so that the watch dog timer cannot be reset.

The procedure for handling a STORE instruction, where data is transferred form a source register in the CPU to a destination location in peripheral device A is similar. The exception handler will occur when the invalid TLB entry is accessed by the MMU during address translation.

The exception handler can return the identity of a faulty peripheral device to an error correction routine. In some cases the faulty peripheral device can be brought back into service, for example by resetting the device. In other cases the device will be taken out of service.

Figure 4:
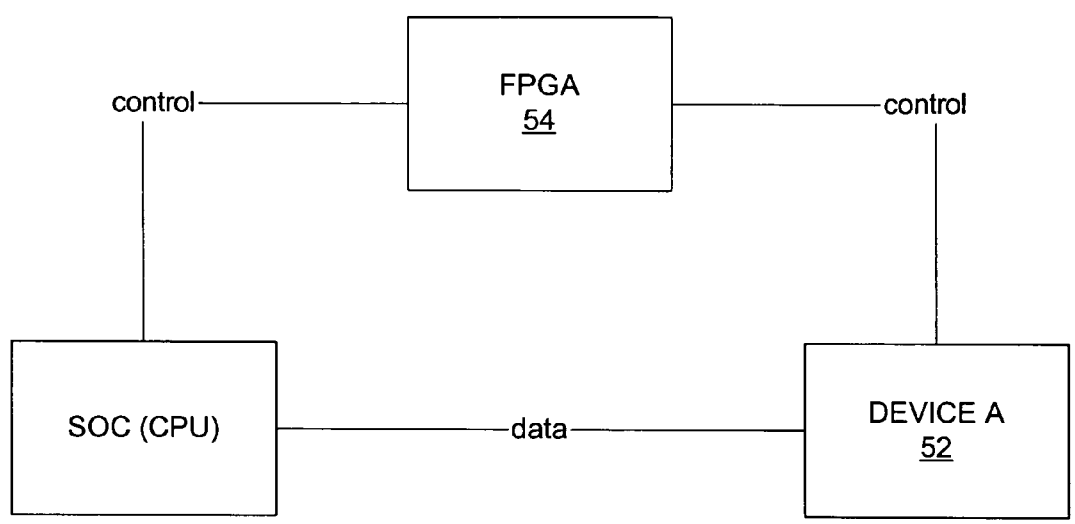
FIG. 4 is a block diagram of an embodiment of the invention that utilizes an FPGA to perform error recovery.

In another embodiment of the invention, the error recovery processes can be implemented external to the SOC, for example in an FPGA (Field Programmable Gate Array). FIG. 4 is a block diagram of this embodiment. In this embodiment the SOC BIU 18 is coupled to a P2P (PCI to PCI) bridge 50 coupled to the bus segment connected to peripheral device A 52. The FPGA 54 is connected to the SOC and device A by control lines. Utilizing the FPGA 54 to perform error recovery frees the CPU to perform other functions. Particular techniques for implementing error recovery are known in the art and not part of the invention.

If the exception handler indicates peripheral device A has not responded then the CPU notifies the FPGA which performs debugging and error recovery routines.

The invention may be implemented as program code, stored on a computer readable medium, that is executed by a digital computer. The computer readable medium may include, among other things, magnetic media, optical media, electro-magnetic fields encoding digital information, and so on.

The invention has now been described with reference to the preferred embodiments. Alternatives and substitutions will now be apparent to persons of skill in the art. For example, although the description references a Broadcom SOC, the invention is not limited to a particular type of SOC but is generally applicable for any system that implements address translation and DMA (Direct Memory Access). Accordingly, it is not intended to limit the invention except as provided by the appended claims.

What is claimed is:

1. A method for accessing a first peripheral device coupled via a bus to a system-on-a-chip (SOC) including a CPU, having a Memory Management Unit (MMU) for performing address translation, where the MMU includes a Translation Look-aside Buffer (TLB) having a first TLB entry for the first peripheral device, with the SOC further including a data mover for transferring data between the first peripheral device and memory independent of the CPU, and a watchdog timer that resets the SOC after a watchdog time-out period expires, said method comprising:

flagging the first TLB entry as invalid;

executing a LOAD or STORE instruction at the CPU for accessing the first peripheral device to transfer data between the first peripheral device and a register on the CPU, where an exception handler occurs when the first TLB entry is accessed during address translation;

with the exception handler:

programming the data mover to move data between the first peripheral device and memory and to transfer data between memory and a CPU register so that the CPU does not execute LOAD or STORE instructions with the first peripheral device as a source or destination to avoid hanging up the CPU and preventing the watchdog timer from being reset before the watch dog timer period expires.

2. The method of claim 1 further comprising:

setting an exception handler timer when the exception occurs;

monitoring the completion status of the data mover; and indicating an error condition if the exception handler time expires before the data mover completes transferring data between the first peripheral device and a CPU register.

3. The method of claim 2 further comprising:
performing error recovery utilizing an external programmable logic integrated circuit.

4. A system for accessing a first peripheral device coupled via a bus to a system-on-a-chip (SOC) including a CPU, having a Memory Management Unit (MMU) for performing address translation, where the MMU includes a Translation Look-aside Buffer (TLB) having a first TLB entry for the first peripheral device, with the SOC further including a data mover for transferring data between the first peripheral device and memory independent of the CPU, and a watchdog timer that resets the SOC after a watchdog time-out period expires, said system comprising:
means for flagging the first TLB entry as invalid;
means for executing a LOAD or STORE instruction at the CPU for accessing the first peripheral device to transfer data between the first peripheral device and a register on the CPU, where an exception handler occurs when the first TLB entry is accessed during address translation;
means for programming the data mover to move data between the first peripheral device and memory and to transfer data between memory and a CPU register so that the CPU does not execute LOAD or STORE instructions with the first peripheral device as a source or destination to avoid hanging up the CPU and preventing the watchdog timer from being reset before the watch dog timer period expires.

5. The system of claim 4 further comprising:
means for setting an exception handler timer when the exception occurs;
means for monitoring the completion status of the data mover; and
means for indicating an error condition if the exception handler time expires before the data mover completes transferring data between the first peripheral device and a CPU register.

6. The method of claim 5 further comprising:
means for performing error recovery utilizing an external programmable logic integrated circuit.

7. One or more computer readable storage media encoded with software comprising computer executable instructions and when the software is executed operable to:
access a first peripheral device coupled via a bus to a system-on-a-chip (SOC) including a CPU, having a Memory Management Unit (MMU) for performing address translation, where the MMU includes a Translation Look-aside Buffer (TLB) having a first TLB entry for the first peripheral device, with the SOC further including a data mover for transferring data between the first peripheral device and memory independent of the CPU, and a watchdog timer that resets the SOC after a watchdog time-out period expires;
flag the first TLB entry as invalid;
execute a LOAD or STORE instruction at the CPU for accessing the first peripheral device to transfer data between the first peripheral device and a register on the CPU, where an exception handler occurs when the first TLB entry is accessed during address translation;
program the data mover to move data between the first peripheral device and memory and to transfer data between memory and a CPU register so that the CPU does not execute LOAD or STORE instructions with the first peripheral device as a source or destination to avoid hanging up the CPU and preventing the watchdog timer from being reset before the watchdog time-out period expires.

8. The computer readable storage media of claim 7 encoded with software when executed further operable to:
set an exception handler timer when the exception occurs;
monitor the completion status of the data mover; and
indicate an error condition if the exception handler time expires before the data mover completes transferring data between the first peripheral device and a CPU register.

9. The computer readable storage media of claim 8 encoded with software when executed further operable to:
perform error recovery utilizing an external programmable logic integrated circuit.

10. A method for accessing a first peripheral device coupled via a bus to a system including a CPU, having a Memory Management Unit (MMU) for performing address translation, where the MMU includes a Translation Look-aside Buffer (TLB) having a first TLB entry for the first peripheral device, with the system further including a data mover for transferring data between the first peripheral device and memory independent of the CPU, and a watchdog timer that resets the system after a watchdog time-out period expires, said method comprising:
flagging the first TLB entry as invalid;
executing a LOAD or STORE instruction at the CPU for accessing the first peripheral device to transfer data between the first peripheral device and a register on the CPU, where an exception handler occurs when the first TLB entry is accessed during address translation;
with the exception handler:
programming the data mover to move data between the first peripheral device and memory and to transfer data between memory and a CPU register so that the CPU does not execute LOAD or STORE instructions with the first peripheral device as a source or destination to avoid hanging up the CPU and preventing the watchdog timer from being reset before the watchdog time-out period expires.

11. The method of claim 10 further comprising:
setting an exception handler timer when the exception occurs;
monitoring the completion status of the data mover; and
indicating an error condition if the exception handler time expires before the data mover completes transferring data between the first peripheral device and a CPU register.

12. The method of claim 11 further comprising:
performing error recovery utilizing an external programmable logic integrated circuit.

13. A system for accessing a first peripheral device coupled via a bus to a system including a CPU, having a Memory Management Unit (MMU) for performing address translation, where the MMU includes a Translation Look-aside Buffer (TLB) having a first TLB entry for the first peripheral device, with the system further including a data mover for transferring data between the first peripheral device and memory independent of the CPU, and a watchdog timer that resets the system after a watchdog time-out period expires, said system comprising:
means for flagging the first TLB entry as invalid;
means for executing a LOAD or STORE instruction at the CPU for accessing the first peripheral device to transfer data between the first peripheral device and a register on the CPU, where an exception handler occurs when the first TLB entry is accessed during address translation;
means for programming the data mover to move data between the first peripheral device and memory and to transfer data between memory and a CPU register so that the CPU does not execute LOAD or STORE instructions with the first peripheral device as a source or destination to avoid hanging up the CPU and preventing the watchdog timer from being reset before the watchdog time-out period expires.

14. The system of claim 13 further comprising:

means for means for setting an exception handler timer when the exception occurs;

means for monitoring the completion status of the data mover; and means for indicating an error condition if the exception handler time expires before the data mover completes transferring data between the first peripheral device and a CPU register.

15. The method of claim 14 further comprising:

means for performing error recovery utilizing an external programmable logic integrated circuit.

16. One or more computer readable storage media encoded with software comprising computer executable instructions and when the software is executed operable to: access a first peripheral device coupled via a bus to a system including a CPU, having a Memory Management Unit (MMU) for performing address translation, where the MMU includes a Translation Look-aside Buffer (TLB) having a first TLB entry for the first peripheral device, with the system further including a data mover for transferring data between the first peripheral device and memory independent of the CPU, and a watchdog timer that resets the system after a watchdog time-out period expire;

flag the first TLB entry as invalid;

execute a LOAD or STORE instruction at the CPU for accessing the first peripheral device to transfer data between the first peripheral device and a register on the CPU, where an exception handler occurs when the first TLB entry is accessed during address translation;

program the data mover to move data between the first peripheral device and memory and to transfer data between memory and a CPU register so that the CPU does not execute LOAD or STORE instructions with the first peripheral device as a source or destination to avoid hanging up the CPU and preventing the watchdog timer from being reset before the watch dog timer period expires.

17. The computer readable storage media of claim 16 encoded with software when executed further operable to:

set an exception handler timer when the exception occurs;

monitor the completion status of the data mover; and indicate an error condition if the exception handler time expires before the data mover completes transferring data between the first peripheral device and a CPU register.

18. The computer readable storage media of claim 17 encoded with software when executed further operable to:

perform error recovery utilizing an external programmable logic integrated circuit.

* * * * *